United States Patent Office 3,545,922
Patented Dec. 8, 1970

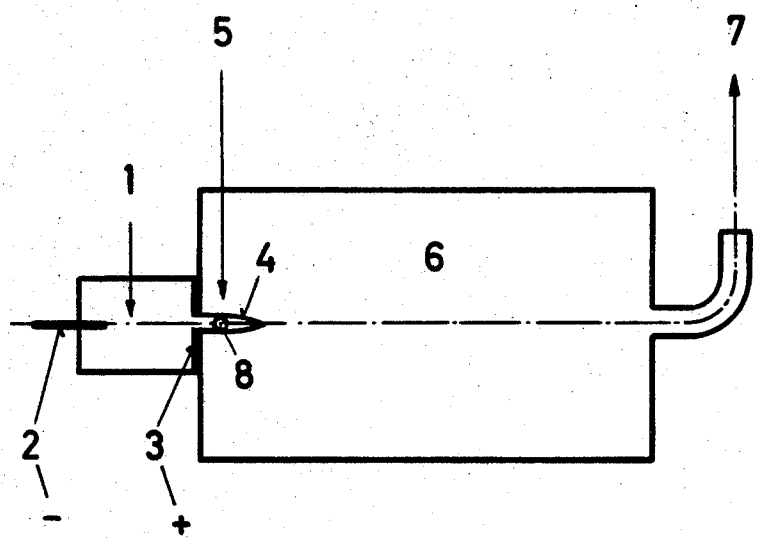

3,545,922
PROCESS FOR THE PREPARATION OF FINELY DIVIDED, NON-PYROPHORIC NITRIDES OF ZIRCONIUM, HAFNIUM, NIOBIUM AND TANTALUM
Ernst Neuenschwander, Basel, Klaus Schuett, Zollikerberg, and Walter Scheller, Munchenstein, Switzerland, assignors, by mesne assignments, to Hermann C. Starck, Berlin, Germany
Original application Dec. 2, 1965, Ser. No. 511,182, now Patent No. 3,429,661, dated Feb. 25, 1969. Divided and this application Nov. 24, 1967, Ser. No. 701,504
Claims priority, application Switzerland, Dec. 10, 1964, 15,999/64
Int. Cl. C01b *21/06;* C22b *61/02*
U.S. Cl. 23—191
2 Claims

ABSTRACT OF THE DISCLOSURE

A process is provided for the preparation of finely divided, non-pyrophoric nitrides of the elements zirconium, hafnium, niobium and tantalum. The nitrides have an average particle size within a range of from .01 to .1 micron, a specific surface of 12 to 40 square meters per gram, and a bulk weight of .2 to .8 gram per cubic centimeter. The nitrides are produced in a plasma jet from a corresponding halide, at temperatures of 2000 to 5000° C.

---

This application is a division of application Ser. No. 511,182, filed Dec. 2, 1965, now U.S. Pat. 3,429,661.

In gas-discharge physics the term "plasma" is used to describe a partially or completely ionized gas. If the plasma as a whole has a directional velocity, it is called a plasma flow or plasma jet. Such a plasma jet can be produced, for example, by blowing a gas through an electric arc. In this manner temperatures of 20,000° C. and higher can be produced. The velocity may range from a few meters per second to several times the speed of sound.

The performance of chemical reactions in a plasma jet is known. In this manner thermal decomposition, reduction with carbon or hydrogen and halogenations have been carried out; furthermore, a series of nitrogen compounds has been manufactured in this manner. See, inter alia, "The Plasma Jet" Scientific American 197, 1957, No. 2, pp. 80 et seq. and "Industrial and Engineering Chemistry," volume 55 [1963], pages 16 et seq.

It is also known that a gas current may consist of an inert gas or of a reactive gas. When, for example, argon is used, a plasma jet is obtained that serves only as a source of heat; when, on the other hand, nitrogen or oxygen is used, there is obtained not only a high-temperature gas but under suitable conditions also a gas that is capable of undergoing chemical reaction. When a carbon or graphite anode is used, reactions with carbon can be carried out in the plasma jet.

The present invention provides a process for the manufacture of finely dispersed, non-pyropheric nitrides of the elements zirconium, hafnium, niobium or tantalum, wherein a halide of one of the said elements and nitrogen or a nitrogen hydride are subjected to the action of a hyrogen plasma, the two starting materials being used in the gaseous state.

Preferred metal halides are those which are easiest to volatilize without decomposing. As a rule they are metal halides of the highest halogenation stage. Preferred use is made of the chlorides, especially of $ZrCl_4$, $HfCl_4$, $NbCl_4$, $NbCl_5$ and $TaCl_5$.

When, as is preferable, elementary nitrogen is used, the reaction proceeds as represented by the following equations (wherein Me represents the zirconium, hafnium, niobium or tantalum atoms):

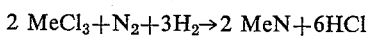

or

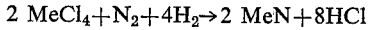

or

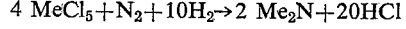

As can be seen from the third reaction equation the metals of Group V form the sub-nitride under the reaction conditions.

Instead of nitrogen there may be used with equal results ammonia, hydrozine or, quite generally, any nitrogen hydride that contains no carbon and no oxygen.

It is a special advantage of the present process that the metal nitrides are obtained in a very finely dispersed form. In general, the average particle size ranges from 0.01 to $0.1\mu$, whereas by the known processes, which depend on the nitridation of mixtures of metal oxides and carbon or the metals as such with $N_2$ or $NH_3$, the average particle size obtained exceeds $1\mu$. The use of metal nitrides having an average particle size below $1\mu$ is of special importance to metallurgical processes, especially for dispersion stabilization. In addition, the present process gives high yields, as a rule over 90%.

A very significant feature of the present process is the fact that non-pyrophoric metal nitrides are obtained. This is certainly unexpected since metals or metalliferous substances of particularly small particle size are generally pyropheric. Borrowing the definition in "Staub" 22 [1962], page 495, the term "pyrophoricity" is here used to describe the spontaneous ignition of a small amount of a powder in the solid state occurring on contact with air at room temperature without the presence of an extraneous igniting agent. Experiments have shown that the metal nitrides produced by the present process are not pyrophoric, which is of great advantage to their handling and further processing.

Another process step consists in subjecting the resulting, very finely pulverulent and very voluminous metal nitride to a subsequent after-treatment in order to reduce its volume and free it from impurities. In a first stage of this after-treatment the powder is rotated for several hours, whereby its bulk volume is reduced to about one fifth. The powder is then heat-treated under a vacuum of $10^{-1}$ to $10^{-4}$ mm. Hg at a temperature at which no grain growth occurs, preferably within the range from 700° to 850° C. It is possible to perform the after-treatment under atmospheric pressure, but in this case the treatment is carried out in a current of nitrogen. After such a treatment, notwithstanding their large surface, the powders are unexpectedly still non-pyrophoric. Oxidation in air progresses only slowly, which is a further factor facilitating the handling of the very fine material.

Instead of a nitride of a single metal there may be produced by the present process with special advantage also finely dispersed, non-pyrophoric mixed nitrides, for example by introducing a mixture of gaseous zirconium tetrachloride and hafnium tetrachloride into the plasma jet.

In the performance of the present process it is advantageous to use for every 0.5 to 3, preferably 1 to 2, parts by volume or mole of nitrogen or nitrogen hydride, 1 part by volume or 1 mol respectively of the metal halide. The two components are introduced into the plasma jet in the vaporized state, either separately or jointly. If desired, there may also be used a carrier gas, such as argon or hydrogen. As a rule the procedure is this: The metal halide is heated to a temperature at which the vapour pressure of the halide is from ½ to 1 atmosphere (gauge), and the nitrogen or the nitrogen hydride or the carrier gas is then conveyed in the gaseous state over the surface of the halide. The gas mixture prepared in this manner is then introduced into the plasma jet.

If the gases are fed in seperately, it is of advantage to introduce the nitrogen or the nitrogenous compound in the vicinity of the anode exit, while the halide is introduced at some distance from it.

The reaction time and the temperature in the plasma jet range from $10^{-2}$ to $10^{-4}$ seconds and from 2000° to 5000° C. respectively, depending on the reaction conditions chosen.

The plasma jet is produced with the use of a strong electric arc in a so-called plasma generator, which is advantageously built along the known principle and comprises a water-cooled, hollow copper anode and a cooled tungsten cathode.

The sole figure of the drawing is a diagrammatic representation of a plasma jet generator in sectional side elevation: 1 is the hydrogen inlet (as a rule the hydrogen is introduced at right angles to the axis of the plasma jet, at a rate that can be varied within wide limits); 2 is the water-cooled cathode which is advantageously variable in its position; 3 is the cooled anode; 4 represents the plasma jet produced; at 5 the temperature ranges from 2000° to 5000° C.; 6 is the reactor chamber and 7 the waste gas outlet; 8 is the inlet for the gas mixture.

The gas mixture or the individual gases are advantageously introduced into the plasma jet through a quartz inlet tube. As a rule the nitride is formed in the plasma jet under atmospheric pressure, though if desired a vacuum may be applied. The most suitable positions at which the gas mixture or the separate gases are introduced into the plasma jet must be determined in each case by suitable preliminary experiments. The amounts of metal halide and nitrogen or nitrogen hydride to be supplied to the plasma jet per unit time depend on the size, temperature and speed of the plasma jet and on the kind and state of the substances applied to it. It is left to the expert to finde the most suitable conditions by way of suitable experiment. As a rule the throughput of hydrogen amounts to 10 to 100, preferably 15 to 40, liters of hydrogen (referred to standard temperature and pressure or "normal liters NL"), per minute, and during the same time 5 to 30 g., preferably 10 to 20 g. of gas mixture consisting of metal halide and nitrogen or nitrogen hydride are introduced into the plasma jet. It is advantageous to use for every 100 mole of hydrogen from 1 to 20, preferably from 2 to 20 mols, of metal halide.

EXAMPLE 1

Manufacture of hafnium nitride

The plasma generator is operated under the following conditions:

Current density—115 amperes
Arc voltage—100 volts
Total output—11.5 kilowatts
$H_2$-throughput, per minute—25 normal liters At the anode exit the plasma jet has a mean velocity of about 200 meters per second and a mean temperature of about 3300° C. Before the anode exit there is added to the $H_2$-plasma per minute, 0.6 g. of $N_2$ and at a distance of 1.5 cm. from the anode per minute 5 g. of $HfCl_4$ with argon as carrier gas. The reaction mixture forms a brilliant jet of 10 to 15 cm. length.

There are obtained per minute 2.8 g. of HfN, corresponding to a yield of 93% of the theoretical.

500 grams of the hafnium nitride obtained in the reactor chamber of the plasma burner are densified by rotation for 15 hours in a container on rollers. The rotary speed is 9000 revolutions per hour. The material is then heated for 10 hours at 750° C. in a weak current of 10 liters of nitrogen per hour and finally cooled.

After the final treatment, the product has the properties shown in Table 1.

EXAMPLE 2

Manufacture of tantalum nitride

For the manufacture of tantalum nitride from tantalum pentachloride the plasma generator is operated under the same conditions as indicated in Example 1 for hafnium nitride. Per minute 10 g. of $TaCl_5$ with argon as carrier gas are supplied and reacted with 0.8 g. of nitrogen in the flame. There are obtained per minute 5.0 g. of $Ta_2N$, corresponding to a yield of 95% of the theoretical.

500 grams of tantalum sub-nitride collected in the reactor chamber of the plasma burner are densified by 15 hours' rotation on rollers at a speed of 9000 revolutions per hour. The sub-nitride is then heat-treated at 800° C. for 10 hours in a weak current of 10 liters of nitrogen per hour, whereby the sub-nitride is at the same time further nitridized to form the nitride TaN. The properties of the after-treated product are shown in Table 1.

TABLE 1

| Property | Method of determination | HfN, subsequent to after-treatment. | TaN, subsequent to after-treatment. |
|---|---|---|---|
| Pyrophoricity | 5 g. spread at 25° C. on plates of glass, exposed to air. | Non-pyrophoric* | Non-pyrophoric.* |
| Specific surface | Method of Brunnauer, Emmet and Teller (HET). | 20-30 m.$^2$/g | 10-18 m.$^2$/g. |
| Particle size | Calculated from specific surface, assuming equally large, spherical particles. | 0.02µ | 0.03µ. |
| | Electron microscopy (electron-optical magnification 20,000:1 total magnification 80,000:1). | 0.01-0.05µ | 0.01-0.07µ. |
| Bulk weight | Measured according to DIN 53468 | 0.2-0.6 g./cc | 0.3-0.8 g./cc. |
| X-ray diagram | Guinier camera, $CuK_d$ radiation | Only HfN | Only TaN. |

*The weight increment in percent over 24 hours is found to be—

| | After | | | | | |
|---|---|---|---|---|---|---|
| | ¼ hr. | ½ hr. | 1 hr. | 2 hrs. | 6 hrs. | 24 hrs. |
| HfN | 0.5 | 0.8 | 1.0 | 1.2 | 1.4 | 2.2% by weight. |
| TaN | 0.4 | 0.6 | 0.7 | 0.9 | 1.1 | 1.4% by weight. |

NOTE.—The experiments reveal that oxidation proceeds only slowly.

EXAMPLE 3

Manufacture of niobium nitrode

To manufacture niobium nitride from niobium pentachloride the plasma generator is operated under the same conditions as indicated in Example 1 for HfN. Per minute 10 g. of $NbCl_5$ with argon as carrier gas are supplied and reacted in the flame with 1.0 g. of nitrogen. There are obtained per minute 3.3 g. of a sub-nitride containing about 6% of nitrogen, that is to say a sub-stoichiometric $Nb_2N$. The yield amounts to 90% of the theoretical.

500 grams of the niobium sub-nitride collected in the reactor chamber of the plasma burner are densified by 15 hours' revolutions (at 9000 rotations per hour) in a container on rollers. The sub-nitride is then heated at 750° C. in a weak current of 10 liters of nitrogen. This heat treatment simultaneously further nitridizes the sub-nitride so that it forms a mixture of the nitrides NbN (ε-phase) and $NbN_x$ (γ-phase, X=0.75 to 0.85). The properties of the product after-treated in this manner are shown in Table 2.

EXAMPLE 4

Manufacture of niobium nitride

To manufacture xironium nitride from xironium tetrachloride the plasma generator is operated under the same conditions as indicated in Example 1 for HfN. Per minute 5 g. of $ZrCl_4$ with argon as carrier gas are introduced and reacted in the flame with 1.0 g. of nitrogen. There are obtained per minute 2.1 g. of ZrN, corresponding to a yield of 92% of the theoretical.

500 grams of the zirconium nitride collected in the reactor chamber of the plasma burner are densified by being rotated for 15 hours in a vessel on rollers at a speed of 9000 rotations per hour. The material is then heated for 10 hours at 750° C. in a week current of 10 liters of nitrogen per hour and then finally cooled. The after-treated product has the properties shown in Table 2.

TABLE 2

| Property | Method of determination | NbN, subsequent to after-treatment. | NrN, subsequent to after-treatment. |
|---|---|---|---|
| Pyrophoricity | 5 g. spread at 25° C. on plate of glass, exposed to air. | Non-pyrophoric[1] | Nonpyrophoric[1]. |
| Specific surface | Method of Brunnauer, Emmet and Teller (DET). | 20–30 m.²/g | 30–40 m.²/g. |
| Particle size | Calculated from specific surface, assuming equally large, spherical particles. | 0.03μ | 0.02μ. |
| | Electron microscopy (electron-optical magnification 20,000:1, total magnification 80,000:1). | 0.01–0.07μ | 0.01–0.06μ |
| Bulk weight | Measured according to DIN 53468 | 0.2–0.6 g./cm.³ | 0.2–0.5 g./cm.³ |
| X-ray diagram | Guinier camera, $CuK_d$ radiation | Hexagonal ε-phase plus tetragonal γ-phase. | Only ZrN. |

[1] The weight increment in percent over 24 hours in found to be—

| | After | | | | | |
|---|---|---|---|---|---|---|
| | ¼ hr. | ½ hr. | 1 hr. | 2 hrs. | 6 hrs. | 24 hrs. |
| NbN | 0.5 | 0.7 | 0.9 | 1.1 | 1.3 | 1.8% by weight. |
| ErN | 0.6 | 0.9 | 1.3 | 1.9 | 2.5 | 3.0% by weight. |

What is claimed is:

1. Non-pyrophoric hafnium nitride in pulverulent form having a particle size within the range from 0.01μ to 0.05μ a specific surface of 20 to 30 m.²/g. and a bulk weight of 0.2 to 0.6 g./cc.

2. Non-pyrophoric zirconium nitride in pulverulent form, having a particle size within the range from 0.01μ to 0.06μ, a specific surface of 30 to 40 m.²/g. and a bulk weight of 0.2 to 0.5 g./cc.

References Cited

UNITED STATES PATENTS

| 3,005,762 | 10/1961 | Fenn | 204—164 |
| 3,253,886 | 5/1966 | Lamprey et al. | 23—191 |
| 3,320,145 | 5/1967 | Case | 204—164 |

FOREIGN PATENTS

| 1,160,831 | 1/1964 | Germany | 23—191 |
| 1,033,553 | 5/1966 | England | 23—191 |

OTHER REFERENCES

Clark, "Advanced Techniques in Powder Metallurgy" (1963), pp. 160–163.

Goetzel, "Treatise on Powder Metallurgy", (1949), vol. I, pp. 100–113.

Metallurgical Society Conference, "New Types of Metal Powders," vol. 23, article by Clough, pp. 9–19, (1963).

OSCAR R. VERTIZ, Primary Examiner

C. B. RODMAN, Assistant Examiner

U.S. Cl. X.R.

204—164